US012785302B2

(12) United States Patent
Sharaf et al.

(10) Patent No.: US 12,785,302 B2
(45) Date of Patent: Nov. 3, 2026

(54) HIGH VOLTAGE CABLE INTEGRATED END CONNECTOR SYSTEM THAT ELIMINATES TERMINAL

(71) Applicant: FCA US LLC, Auburn Hills, MI (US)

(72) Inventors: Nadir Sharaf, Bloomfield Hills, MI (US); Daniel R Luedtke, Beverly Hills, MI (US); Jamal Alghanem, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 150 days.

(21) Appl. No.: 18/591,269

(22) Filed: Feb. 29, 2024

(65) Prior Publication Data

US 2025/0279594 A1 Sep. 4, 2025

(51) Int. Cl.
*H01R 4/70* (2006.01)
*H01R 4/02* (2006.01)

(52) U.S. Cl.
CPC ................. *H01R 4/70* (2013.01); *H01R 4/02* (2013.01)

(58) Field of Classification Search
CPC ... H01R 4/02; H01R 4/10; H01R 4/12; H01R 4/021; H01R 4/34; H01R 11/09; H01R 11/11; H01R 11/12; H01R 43/02; H01R 43/0214; H01R 43/0249; H01R 43/0207; H01R 43/04; H01R 43/28; H01B 7/009
USPC ............ 174/15.1, 74 R–88 C, 128.1; 439/98, 439/502, 587, 736, 658, 693, 755, 762, 439/768, 874, 883; 29/854, 860, 861, 29/863, 868, 869, 883–884
See application file for complete search history.

(56) References Cited

U.S. PATENT DOCUMENTS

| | | | | | |
|---|---|---|---|---|---|
| 1,751,405 | A * | 3/1930 | Herman | H01R 11/12 | 29/874 |
| 4,038,743 | A * | 8/1977 | DuRocher | H01R 4/026 | 228/904 |
| 4,775,337 | A * | 10/1988 | Van Wagener | H01R 11/12 | 439/883 |
| 5,191,710 | A * | 3/1993 | Fujimaki | H01R 11/12 | 439/502 |
| 5,541,380 | A * | 7/1996 | Ogden | H01R 35/02 | 219/56.22 |
| 5,960,540 | A * | 10/1999 | Pentz | H01R 43/16 | 29/33 M |
| 6,452,101 | B1 * | 9/2002 | Haramaki | H01B 5/00 | 174/128.1 |

(Continued)

FOREIGN PATENT DOCUMENTS

EP 1973200 A1 * 9/2008 ............. H01R 11/12

*Primary Examiner* — William H. Mayo, III
(74) *Attorney, Agent, or Firm* — Jeremy J. Klobucar

(57) ABSTRACT

A high voltage high current electrical cable includes a plurality of strands forming the electrical cable, where the electrical cable includes a first end and a second opposite end, with the first end having a first portion and a second portion. The second portion forming a distal end of the first end of the cable, with the first portion of the cable being encapsulated in an insulation material and the second portion being free of the insulation material. The plurality of strands in the second portion are sized and shaped and fused together into an integrated connection terminal, with the integrated connection terminal consisting of the fused together plurality of strands such that the first end of the electrical cable is free from a separate terminal component being coupled thereto.

8 Claims, 8 Drawing Sheets

(56) References Cited

U.S. PATENT DOCUMENTS

| | | | | | |
|---|---|---|---|---|---|
| 6,719,595 | B1 * | 4/2004 | Welcker | H01R 43/0207 | 439/883 |
| 7,228,628 | B2 * | 6/2007 | Wolfel | H01R 12/585 | 29/874 |
| 7,413,488 | B2 * | 8/2008 | Matsumura | H01H 85/044 | 439/874 |
| 9,159,474 | B2 * | 10/2015 | Ito | H01R 43/0207 | |
| 9,763,625 | B2 * | 9/2017 | Laughner | A61B 5/7253 | |
| 10,944,228 | B2 * | 3/2021 | Steinberg | C23C 24/04 | |
| 11,942,748 | B2 * | 3/2024 | Mathews | H01R 4/02 | |
| 12,126,101 | B2 * | 10/2024 | Blakborn | H01R 11/09 | |
| 2009/0078447 | A1 * | 3/2009 | Brantsch | H01R 11/12 | 174/128.1 |
| 2011/0198122 | A1 * | 8/2011 | Sagawa | H01R 4/023 | 174/84 R |
| 2016/0036141 | A1 * | 2/2016 | Lawson | H01R 11/12 | 439/784 |
| 2021/0044071 | A1 * | 2/2021 | Mathews | H01R 4/02 | |

* cited by examiner

HIGH VOLTAGE CABLE INTEGRATED END CONNECTOR SYSTEM THAT ELIMINATES TERMINAL

FIELD

The present application generally relates to cable connection systems for electrical cables and, more particularly, to a high voltage high current electrical cable having an integrated cable connection system that eliminates a terminal.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In today's electrified vehicles, improving overall vehicle efficiency is a common design target. One manner in which vehicle manufacturers meet this target is to reduce the size and weight of certain vehicle components. In the area of electrification, there is a desire to reduce the size and weight of cable connection arrangements, such as for junction boxes, modules and the like. Conventional electrical cable terminal connection systems often drive a necessary larger size of these connection arrangements in order to accommodate the metal plate connector terminals of such conventional cables. In addition to driving the larger size of the mating components, these conventional cable terminals also add weight to the electrical cables. Accordingly, while such conventional electrical cable terminals do work for their intended purpose, there exists an opportunity for improvement in the relevant art.

SUMMARY

According to one example aspect of the invention, a high voltage high current electrical cable is provided. In one exemplary implementation, the electrical cable includes: a plurality of strands forming the electrical cable, with the electrical cable including a first end and a second opposite end, the first end including a first portion and a second portion, the second portion forming a distal end of the first end of the cable; wherein the first portion of the cable is encapsulated in an insulation material and the second portion is free of the insulation material; and wherein the plurality of strands in the second portion are sized and shaped and fused together into an integrated connection terminal, with the integrated connection terminal consisting of the fused together plurality of strands such that the first end of the electrical cable is free from a separate terminal component being coupled thereto.

In some implementations, the electrical cable includes a third portion after the second portion; wherein the third portion forms the distal end of the first end of the cable with the second portion being between the first and third portions; and wherein the third portion is encapsulated in the insulation material.

In some implementations, the plurality of strands in the third portion are recessed inside the insulation material. In some implementations, wherein the recessed plurality of strands are secured to each other and the insulation with an adhesive.

In some implementations, the plurality of strands are fused together via welding. In some implementations, the plurality of strands are fused together via ultrasonic welding. In some implementations, the integrated connection terminal forms a plate-like structure consisting only of the fused together plurality of strands.

In some implementations, the integrated connection terminal comprises a flat configuration for connection to a receiving component. In some implementations, the plurality of strands in the second portion are sized and shaped and fused together into an integrated connection terminal forming an aperture therein.

In some implementations, the electrical cable includes a fourth portion after the first portion and before the second portion, the fourth portion being free of the insulation material and including the plurality of strands in an unfused state; wherein the fourth portion includes a circular shape in cross-section, and the second portion includes a square or rectangular shape in cross-section having at least flat and parallel upper and lower opposed faces. In some implementations, the electrical cable includes a fourth portion after the first portion and before the second portion, the fourth portion being free of the insulation material and including the plurality of strands in an unfused state; wherein the fourth portion includes a circular shape in cross-section, the second portion includes a square or rectangular shape in cross-section having at least flat and parallel upper and lower opposed faces, and the third portion includes a circular shape in cross-section.

In some implementations, the electrical cable includes a first transition portion between the fourth portion and the second portion, and a second transition portion between the second portion and the third potion; wherein an average width of the first and second transition portions is greater than a width of the first and third portions and less than a width of the second portion.

According to one example aspect of the invention, a high voltage high current electrical cable is provided. In one exemplary implementation, the electrical cable includes: a plurality of strands forming the electrical cable, wherein the electrical cable includes a first end and a second opposite end, the first end including a first portion and a second portion forming a distal end of the first end of the cable; the first portion of the cable being encapsulated in an insulation material, and the second portion of the cable being free of the insulation material and having a distal end; wherein the plurality of strands in the second portion are: i) sized and shaped into a looped connection structure where the distal end of the plurality of strands of the second portion is integrated back into the plurality of strands exiting the first portion; and ii) fused together in the looped connection structure to form an integrated and fused looped connection terminal; wherein the integrated connection terminal consists of the fused together plurality of strands such that the first end of the electrical cable is free from a separate terminal component being coupled thereto.

In some implementations, the integrated looped connection terminal forms an aperture configured to receive a fastener for connection of the integrated looped connection terminal to a mating component. In some implementations, the integrated looped connection terminal forms a plate-like structure consisting only of the fused together plurality of strands.

Further areas of applicability of the teachings of the present application will become apparent from the detailed description, claims and the drawings provided hereinafter, wherein like reference numerals refer to like features throughout the several views of the drawings. The claims form an integral part of the disclosure. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

The present disclosure will become more fully understood from the detailed description and the accompanying drawings, given purely by way of non-limiting example, wherein.

DESCRIPTION

Figure 1:
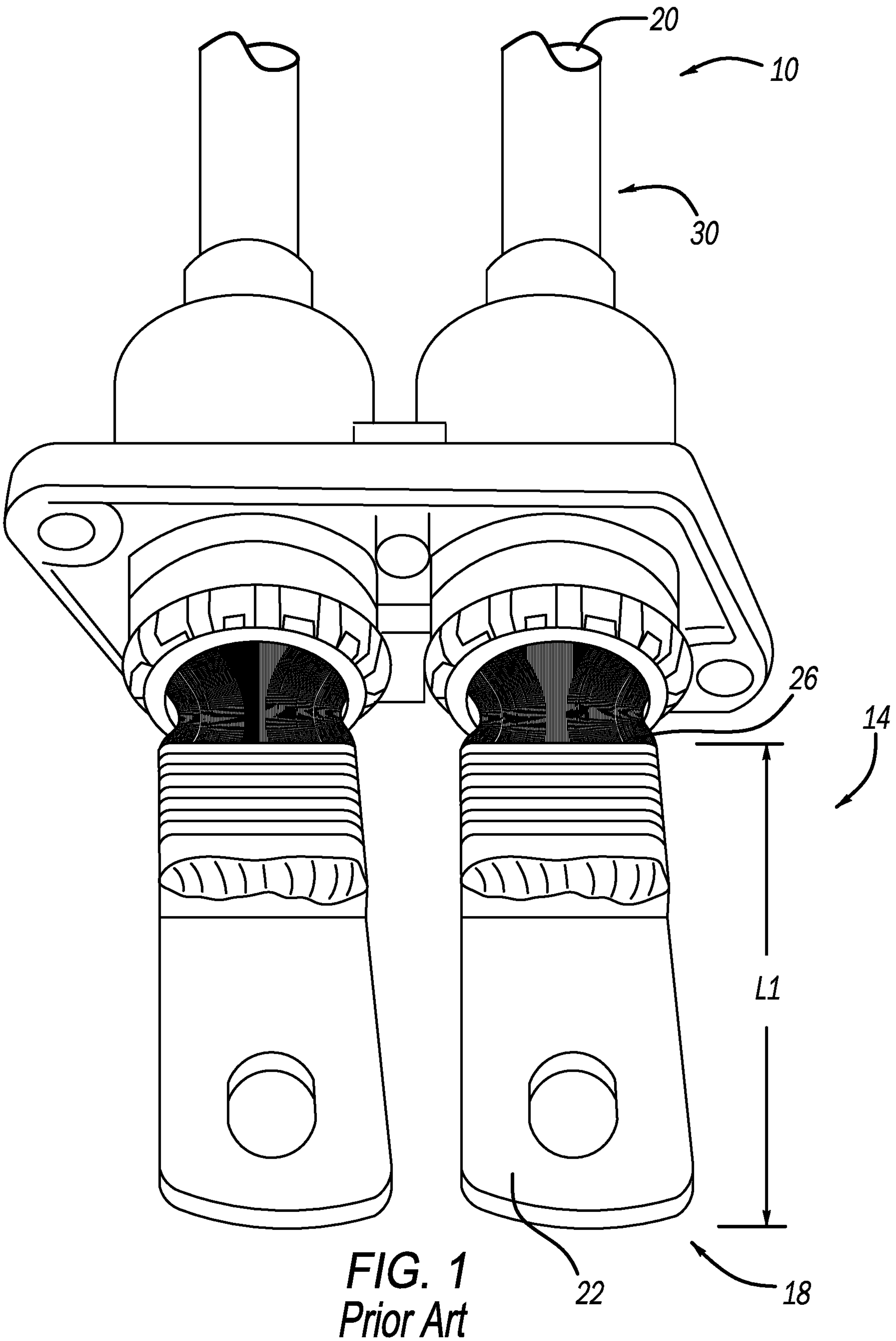
FIG. 1 Prior Art
FIG. 1 illustrates a prior art high voltage high current electrical cable connection system having a metal plate welded to an end of strands of the cable.
Figure 2:
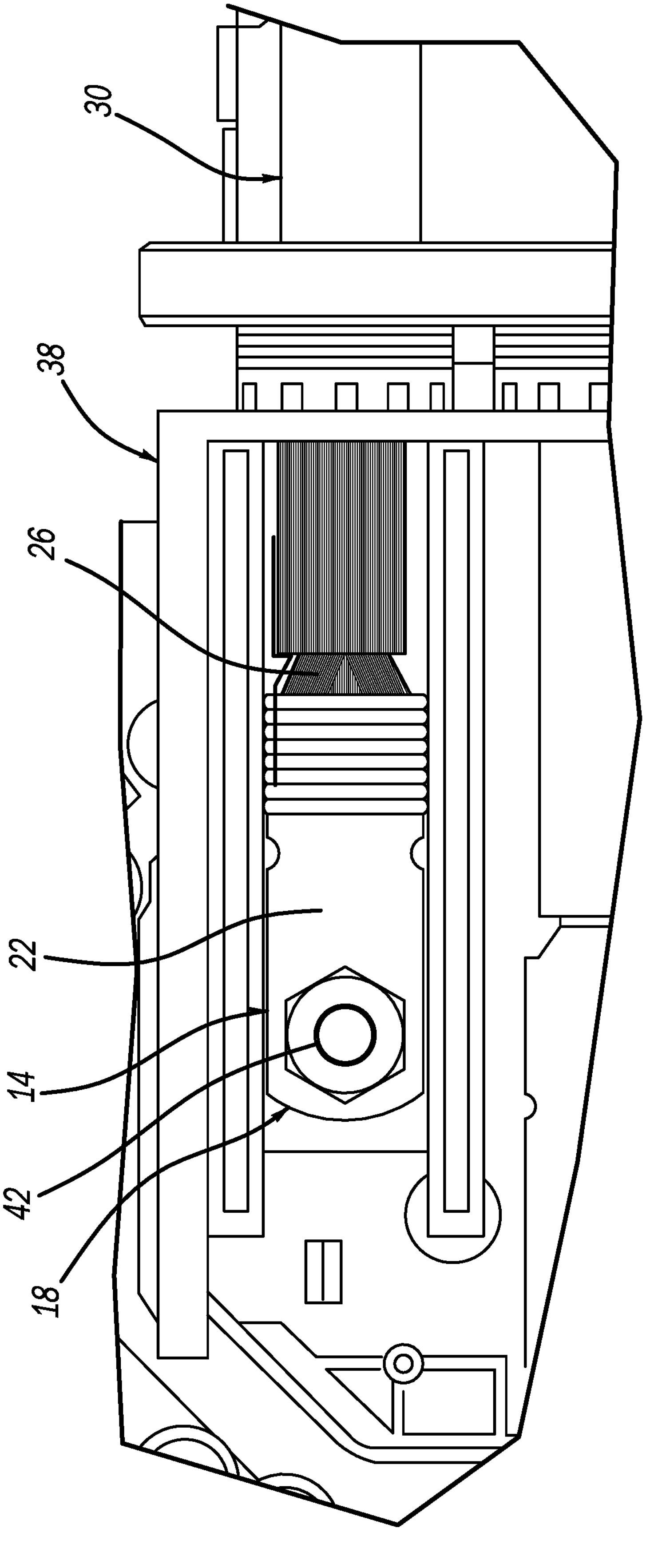
FIG. 2 Prior Art
FIG. 2 illustrates the electrical cable connection system of FIG. 1 coupled to a junction box and having a loose wire strand detached from the welded area resulting in a potential defect.

As previously discussed, conventional high voltage electric cable connector systems have a terminal at a connection end thereof. For example, the prior art connection system 10 shown in FIG. 1 includes a first end 14 having a conventional terminal arrangement 18, and a second opposite end 20. This terminal arrangement 18 includes a separate and distinct terminal plate 22 that is typically welded to an end portion of the plurality of strands 26 that make up the stranded wire cable 30. As can be seen in FIG. 1, this conventional terminal arrangement 18 requires a notable length L1 to accommodate the connection end of the plate 22 as well as the opposite end of the plate that is welded to the strands 26. This length L1 requires a correspondingly large connection area in a receiving junction box 38 or power inverter module or the like, as shown for example in FIG. 2, which adds weight to the vehicle. Moreover, this terminal arrangement 18 requires additional manufacturing steps to handle and secure the terminal plate 22 to the cable 30, which results in a more complex and less efficient manufacturing process. It has also been observed that with this conventional terminal arrangement 18, one or more strands 26A of the plurality of strands can become loose or break free at one end and be push back during the assembly process into the junction box 38, which can potentially result in a manufacturing and/or assembly defect situation. The terminal 22 can be coupled to the junction box or the like 38 with a fastener 42, as shown in FIG. 2.

Accordingly, improved high voltage high current electric cable (hereinafter, “cable”) connection systems are presented herein. These systems eliminate the distinct terminal plate 22 resulting in a lighter weight and more compact connection arrangement at the first end of the cable. In addition, with the terminal plate being eliminated, the manufacturing process is less complex and more efficient due to the elimination of an operation. Moreover, the first end of the improved connection systems is more compact (shorter length) thereby requiring less space in a mating component, such as junction box or power inventor module 38, which allows for further weight reduction through the use of a smaller junction box 38.

Figure 3A:
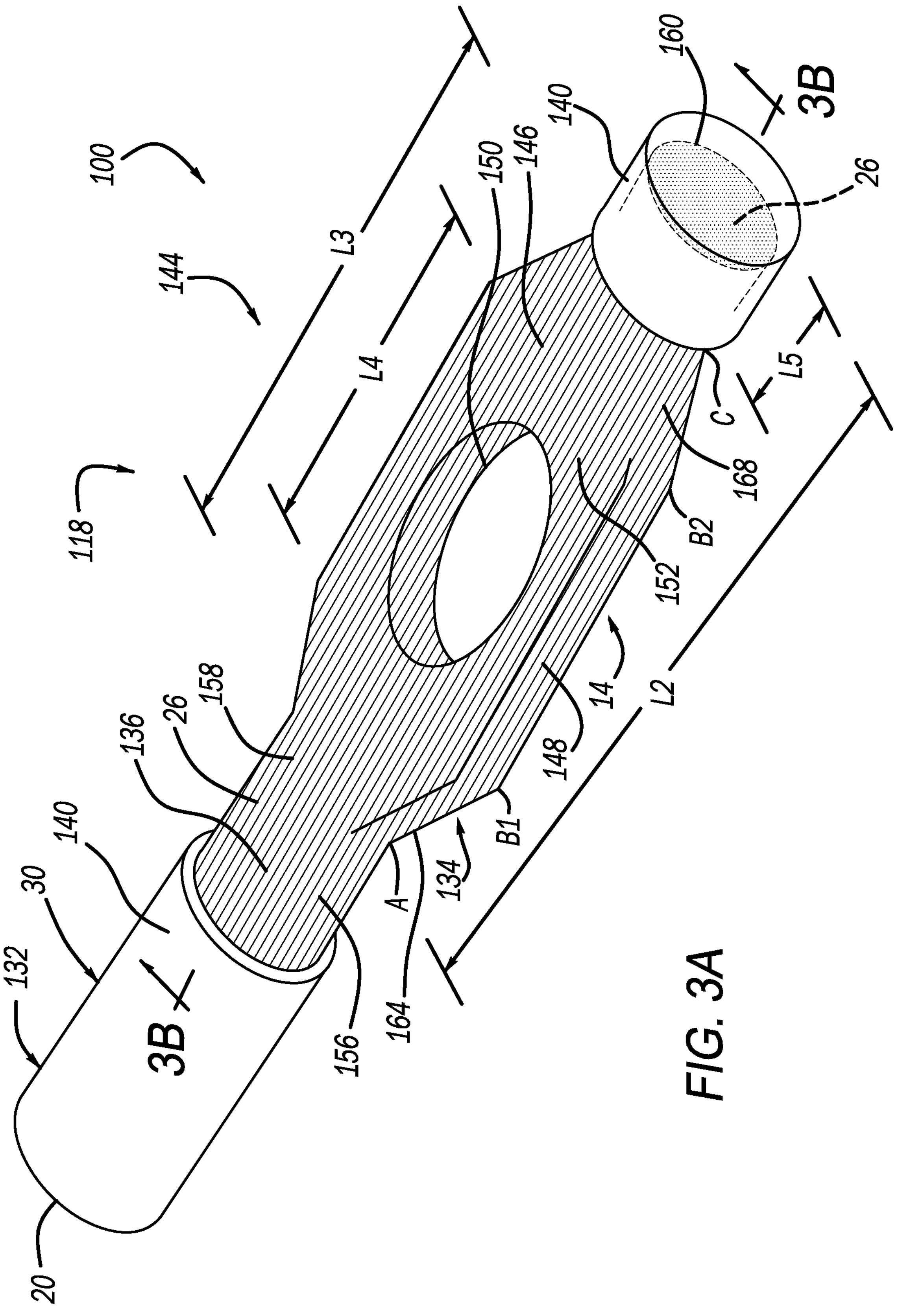
FIG. 3A illustrates an integrated electrical cable connection system having an integrally formed connection area at a first end of the cable according to the principles of the present application.

Turning now to FIGS. 3A-3F and with initial focus on FIG. 3A, one example implementation of the improved connection system is shown at reference numeral 100. For components similar to or the same as system 10, like reference numerals will be utilized. Connection system 100 incudes the plurality of strands 26 that make up the electric cable 30. The plurality of strands 30 are encapsulated in insulation 140, as is known in the art. Connection system 100 also includes an improved connection arrangement 118 at the first end 14, where the distinct terminal plate 22 has been eliminated in favor of an integral wire strand based connection area 144. The first end 14 can include a first portion 132 and a second portion 134. In general, the first portion 132 is covered in insulation 140 and the second portion is free of the insulation 140. In general, the first portion 132 ends at the beginning of the second portion 134. In this regard, the first portion 132 can include a distal end 136 that ends at the end of the insulation 140 or extends slightly beyond the insultation 140, as shown in FIG. 3A.

The improved connection arrangement 118 includes an area 144 where the plurality of strands 26 are sized and shaped and/or configured into a flat or substantially flat or planar connection area 144. This connection area 144 has a rectangular or substantially rectangular shape 148, although other shapes are contemplated. The connection area structure 144 also includes flat or substantially flat upper and lower faces or surfaces 146. In this flat connection area 144, the strands 26 are also sized and shaped to from an aperture 150 configured to receive the fastener 42. In this example implementation, the aperture 150 can be formed by shaping the strands 26 without any post processing cutting or drilling, etc. to form the aperture 150, besides the fusing that is discussed immediately below. In the flat connection area 144, the plurality of strands 26 are fused together to form essentially a fused structure like a weld nugget or a plate-like connection structure 152 having aperture 150. In some implementations, the fusing occurs by ultrasonic welding where there are not any additional materials utilized to fuse together the plurality of strands of connection structure 152.

It should be appreciated that the plurality of strands 26 used to form the integrated wire based connection area 144 (and fused connection structure 152) are the same strands 26 extending throughout and forming cable 30. In other words, there are not any additional or other strands used to make connection structure 152. For example, for a given length of cable 30, the insulation 140 is removed from at least a portion of the first end 14 to expose the wire strands 26 in their original circular or other shape 156 within the insulation 140 at area 158. At least a portion of a length of the exposed wire strands 26 are then sized and shaped and/or configured into the flat or substantially flat or planar connection area 144. Subsequently or concurrently, the strands 26 are fused together in the connection area 144 to form the fused connection structure 152. As can be appreciated, the plurality of wire strands 26 remain continuous through the entire exposed area of the strands 30 from distal end 160 through the fused connection area 144 and to and into the insulation 140 of the first portion 132.

In some implementations, there is a transition area 164 from the plurality of strands 26 at location 158 in their typical circular shape in cross section 156 to the connection area 144. For example only, this transition area could take place from point A to point B1, which in this example represents the start of the fused connection structure 152. In some implementations, the transition area 164 could be partly or fully fused in the same manner as the connection area 144.

In some implementations, such as the example shown in FIG. 3A, the plurality of strands may continue beyond the fused connection structure 152 having length L4 into another transition area 168 back to the circular shape 156 of the unfused plurality of strands 26 for a length L5. The length L5 corresponds to a third portion of the first end 14 and is denoted by the alpha-numeric reference "L5". The strands 26 in the area having length L5 can be in their original or substantially original form and shape, as well as have original insulation 140 remaining to hold the loose wire strands 26 together. In this implementation, when the insulation 140 is originally removed from the first end 14 as discussed above, the original insulation at the area of length L5 is not removed and remains. As with transition area 164, transition area 168 may be partially or fully fused in the same manner as connection structure 152. In this example implementation, the insulation 140 may extend beyond the distal end 160 of the strands 26 such that the strands 26 are recessed therein. In this implementation, the strands may be secured to each other and/or the insulation 140 at distal end 160 with an appropriate glue or adhesive or other securement methods.

In the example implementation shown in FIG. 3A, the fused connection area 144 can include only the rectangular structure 148 having the length L4 extending from location B1 to location B2. In this example, the length L4 is less than the prior art terminal connection length L1. In some implementations, the fused connection structure 152 may include one or both transition areas 164, 168 having a length up to L3 extending from up to location A to up to location C. In some implementations, the length L3 is less than the prior art length L1. In some implementations, the first end 14 can include a length L2 from a beginning A of transition area 164 to the distal end 160. In this implementation, the length L5 can be less than the prior art terminal length L1.

Figure 3B:
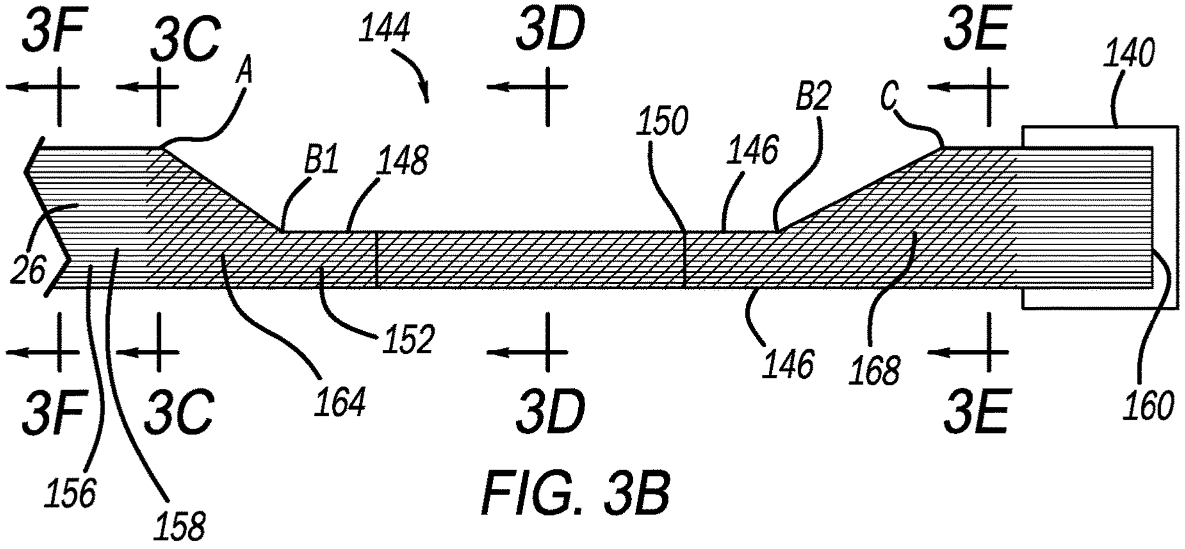
FIG. 3B illustrates a longitudinal section through FIG. 3A showing areas of the plurality of strands that make up the cable that are and are not fused together according to the principles of the present application.
Figure 3C:
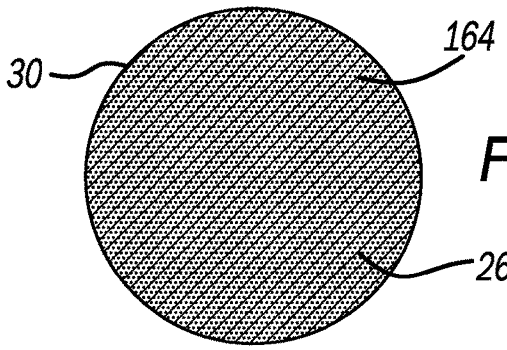
FIGS. 3C-3F illustrate cross sectional views of FIG. 3B in multiple different locations at the first end of the electrical cable according to the principles of the present application.
Figure 3D:
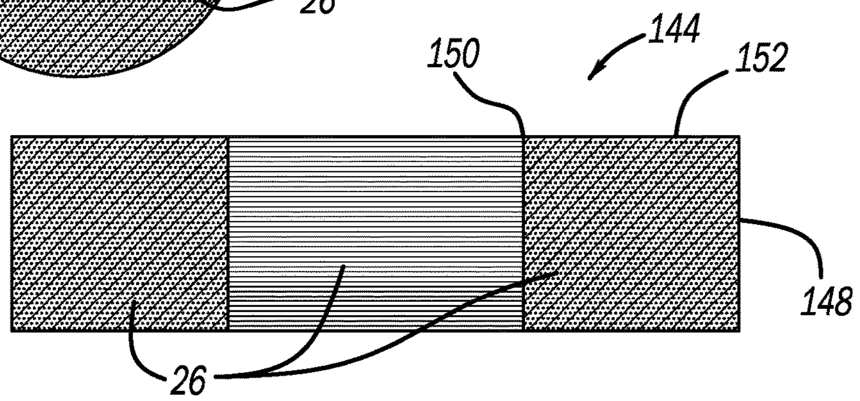
Figure 3E:
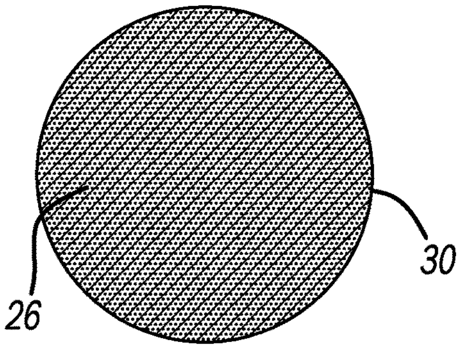
Figure 3F:
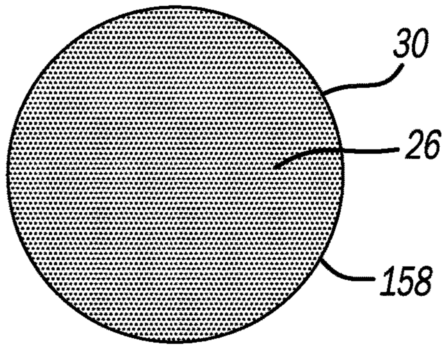
Figure 4A:
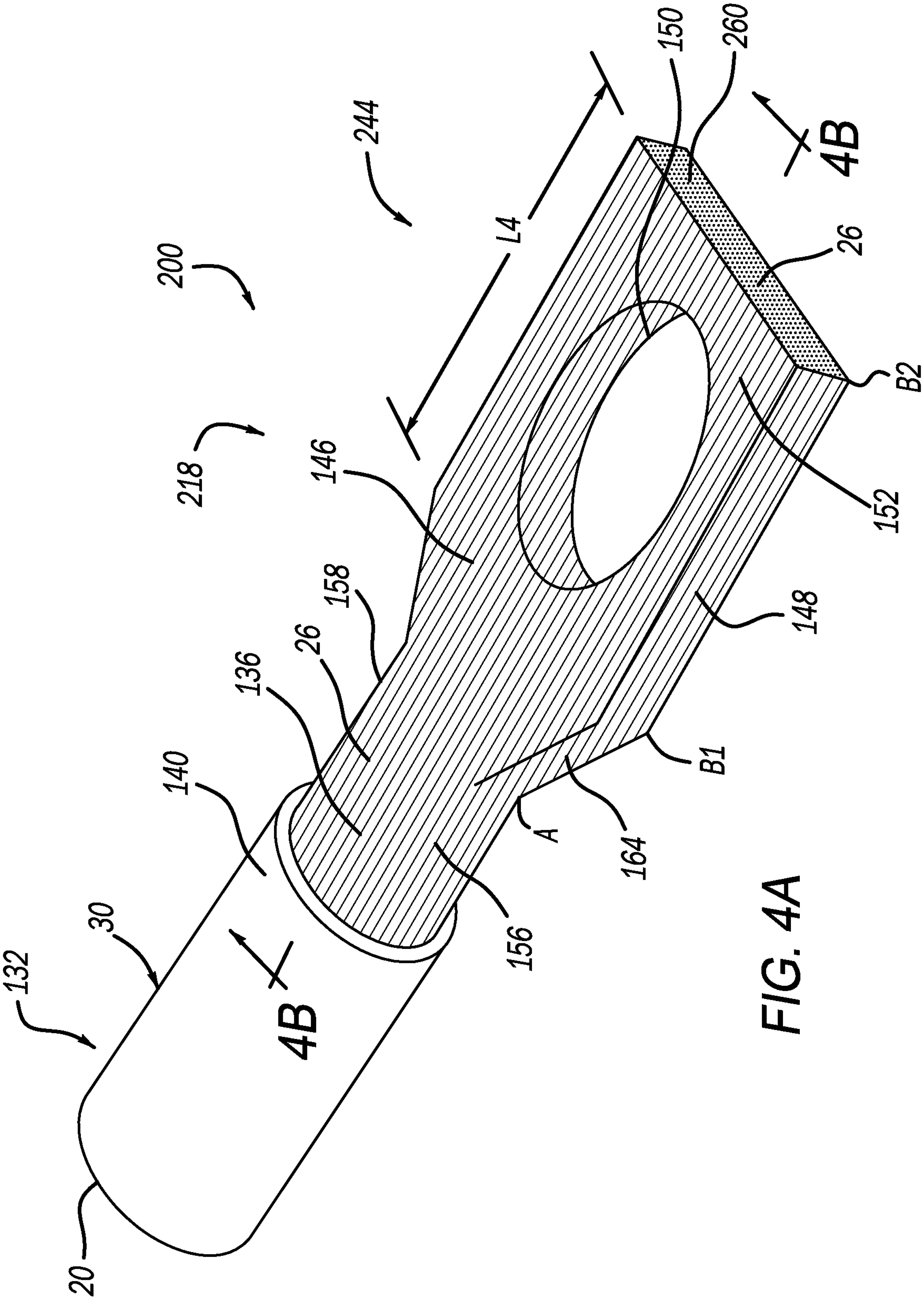
FIG. 4A illustrates an integrated electrical cable connection system having an integrally formed connection area at a first end of the cable according to the principles of the present application.
Figure 4B:
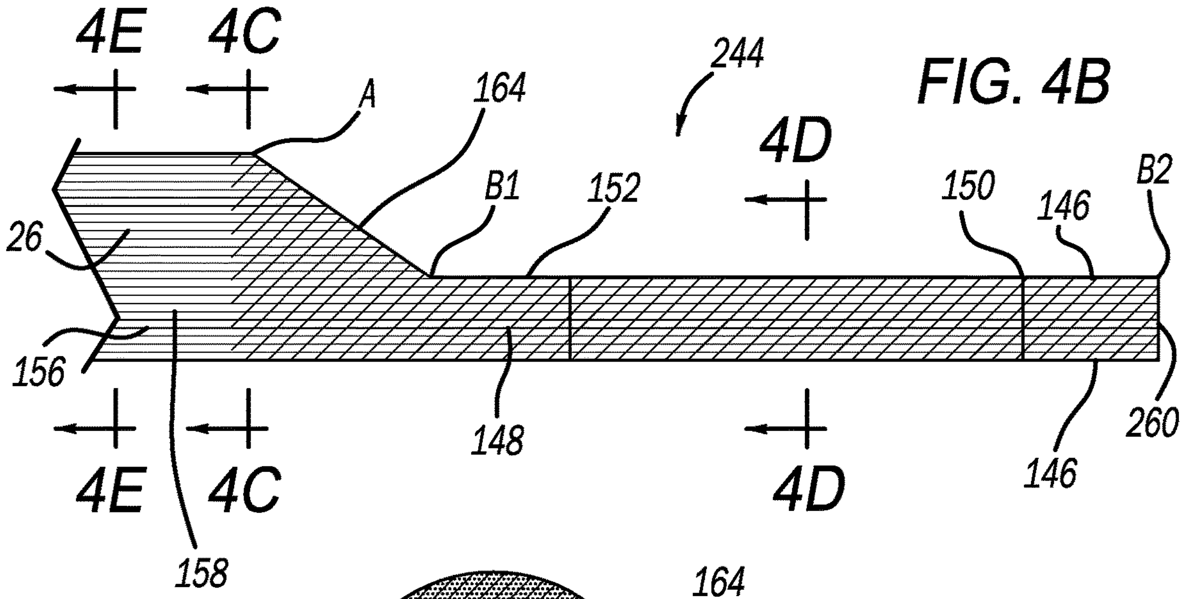
FIG. 4B illustrates a longitudinal section through FIG. 4A showing areas of the plurality of strands that make up the cable that are and are not fused together according to the principles of the present application.
Figure 4C:
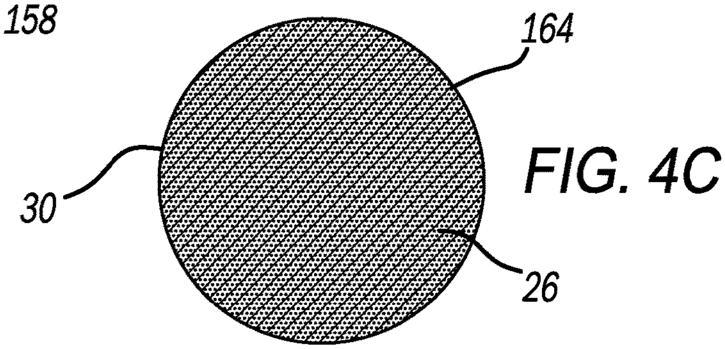
FIGS. 4C-4E illustrate cross sectional views of FIG. 4B in multiple different locations at the first end of the electrical cable according to the principles of the present application.
Figure 4D:
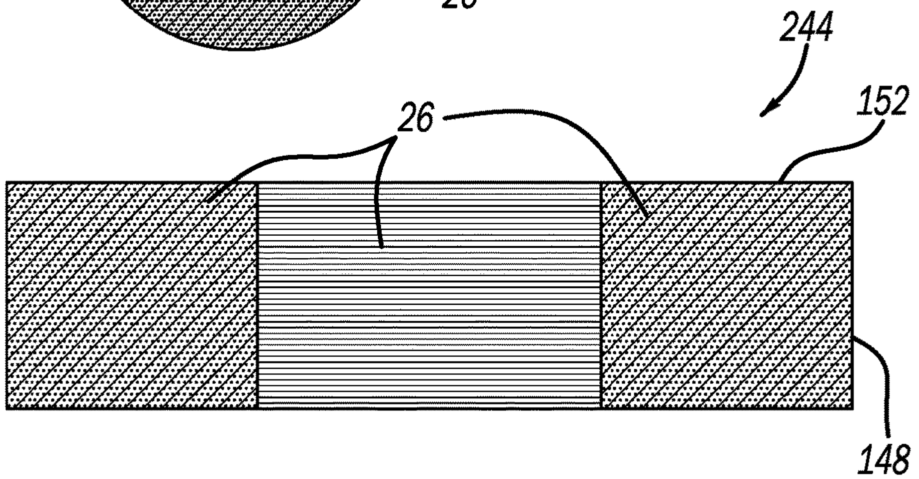
Figure 4E:
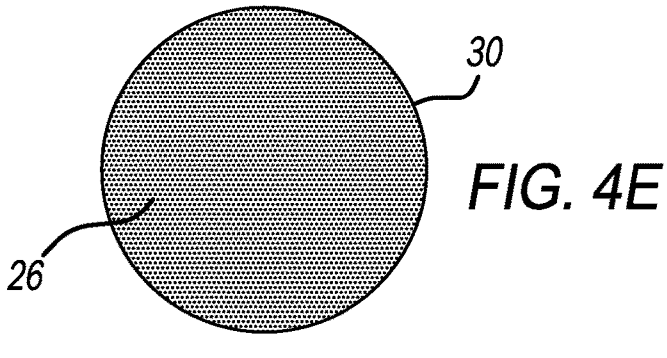

Turning now to FIGS. 3B-3F, and with continuing reference to FIG. 3A, various sectional views are shown to visually describe areas of the first end 14 of wire strand 30 that are and are not fused together in the example implementation shown in FIG. 3A. FIG. 3B represents a longitudinal section taken though first end 14 from before area A though distal end 160. Here it can be seen that the entire fused area of the first end 14 includes transition areas 164, 168 and connection area 144, corresponding to length L3. The sectional views shown in FIGS. 3C and 3E of the ends of the fused transition areas 164, 168 can be compared and contrasted to the unfused area 158 proximal to the beginning A of fused transition area 164. FIG. 3D represents a sectional view through the integrated fused connection structure 152 including aperture 150.

Turning now to FIGS. 4A-4E, a variation of the connection system 100 is shown at reference numeral 200, where similar features to system 100 are indicated with like reference numerals. In general, connection system 200 is the same or substantially the same as connection system 100 up to the point or location B2. At location B2, which represents the end of fused connection area 144 and structure 152 having length L4, the connection system 200 ends at terminal end 260. At terminal end 260, the plurality of wire strands 26 are fused so as to hold them together and prevent separation during installation.

The sectional views shown in FIGS. 4B, 40, 4D and 4E correspond to the respective sectional views 3B, 3C, 3D and 3F of FIG. 3. It will be appreciated that while FIG. 4 shows transition area 164 being fused, this transition area can also be provided in the same partially or unfused alternatives discussed above in connection with FIG. 3A.

Turning now to FIGS. 5A-5D, a variation of the connection system 100 is shown at reference numeral 300, where similar features to systems 100 and/or 200 are indicated with like reference numerals. Connection system 300 includes an alternative connection area 344 at first end 14 of wire cable 30. In this example arrangement, the insulation 140 is removed from the first end 14 and the distal end 360 of the plurality of wire strands 26 are sized and shaped into a loop configuration forming the connection area 344.

To form the loop configuration, the distal end 360 of strands 26 are meshed back into the original wire strands 26 extending from insulation 140 in area 158. The meshing occurs in a transition area 364. The loop configuration forms the aperture 150 for receiving fastener 42. In this example implementation, the looped configuration of the wire strands 26 forming the connection area 344 are fused together starting from and including transition area 364 through an overall distal end 372 of connection area 344.

Figure 5A:
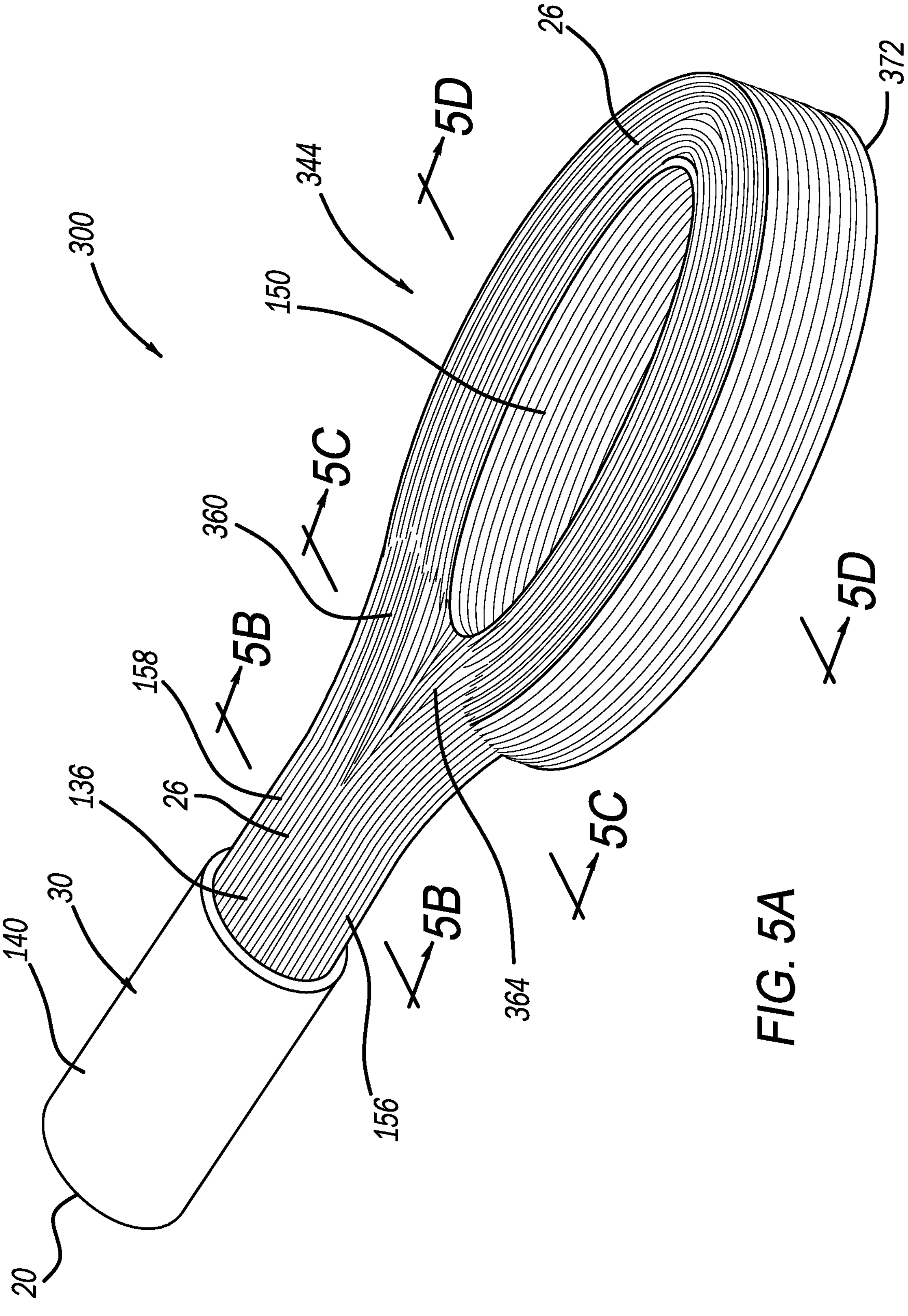
FIG. 5A illustrates an integrated electrical cable connection system having an integrally formed connection area at a first end of the cable according to the principles of the present application.
Figure 5B:
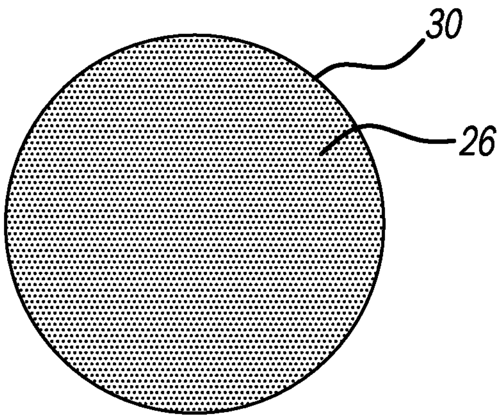
FIGS. 5C-5D illustrate cross sectional views of FIG. 5A in multiple different locations at the first end of the electrical cable according to the principles of the present application.
Figure 5C:
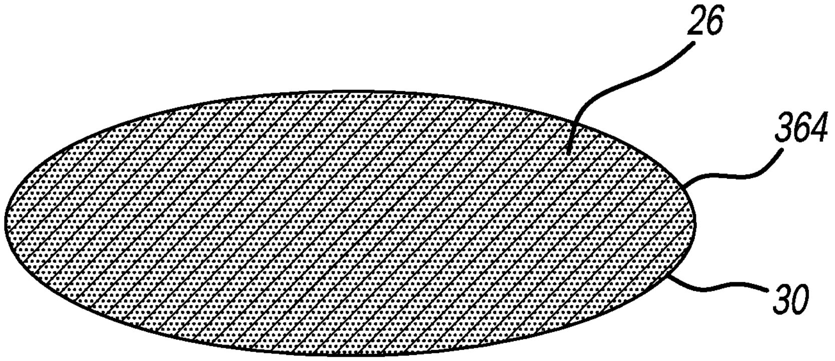
Figure 5D:
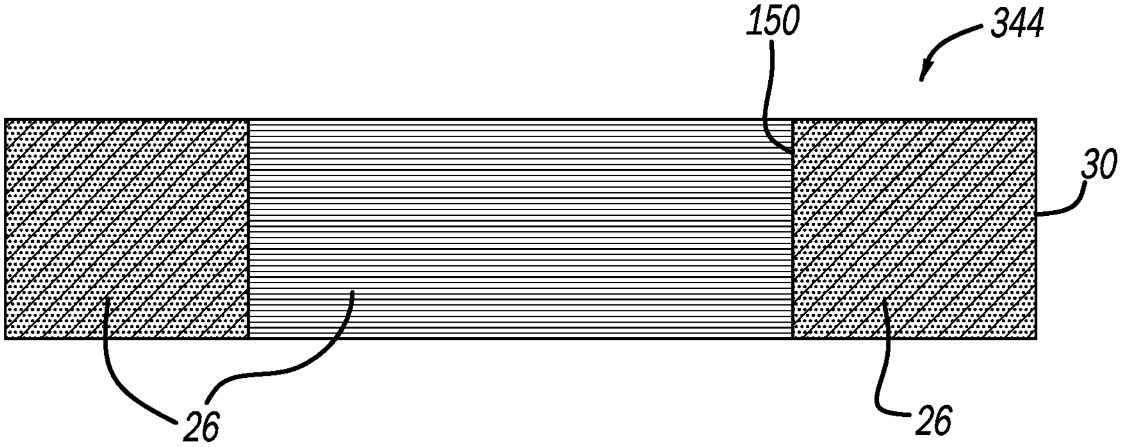

The sectional views shown in FIGS. 5B, 5C and 5D illustrate the wire strands 26 in their original, unfused state in FIG. 5C at location 158; in their fused state in FIG. 5C at transition area 364, and in their fused state in FIG. 5C throughout connection/loop area 344.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

It will be appreciated that the term "controller" or "control system" (as well as "module" and "unit") as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Some portions of the above description may present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A high voltage high current electrical cable comprising:

a plurality of strands forming the electrical cable, wherein the electrical cable includes a first end area, the first end area including a first portion, a second portion and a third portion, wherein the third portion is encapsulated in the insulation material and forms a distal end of the cable with the second portion being between the first and third portions;

wherein the first portion of the cable is encapsulated in an insulation material and the second portion is free of the insulation material;

wherein the plurality of strands in the second portion are sized and shaped and fused together into an integrated connection terminal, the integrated connection terminal consisting of the fused together plurality of strands such that the first end area of the electrical cable is free from a separate terminal component being coupled thereto;

a first transition portion between the first and second portions, and a second transition portion between the second and third portions, wherein an average width of the first and second transition portions is greater than a width of the first and third portions and less than a width of the second portion, and wherein the strands of the first and second transition portions are fused together for at least a partial length of each transition portion; and wherein the second portion includes a square or rectangular shape in cross-section having at least flat and parallel upper and lower opposed faces and parallel side faces, and the first and third portions include a circular shape in cross-section, and wherein the lower face forms a bottom surface of the second portion which aligns with corresponding bottom surfaces of the first and second transition portions and the plurality of strands of the third portion.

2. The electrical cable of claim 1, wherein the plurality of strands in the third portion are recessed inside the insulation material.

3. The electrical cable of claim 2, wherein the recessed plurality of strands are secured to each other and the insulation with an adhesive at the terminal end of the cable.

4. The electrical cable of claim 1, wherein the plurality of strands are fused together via welding.

5. The electrical cable of claim 1, wherein the plurality of strands are fused together via ultrasonic welding.

6. The electrical cable of claim 1, wherein the integrated connection terminal comprises a flat configuration for connection to a receiving component.

7. The electrical cable of claim 6, wherein the plurality of strands in the second portion are sized and shaped and fused together into an integrated connection terminal forming an aperture therein.

8. The electrical cable of claim 1, wherein the integrated connection terminal forms a plate-like structure consisting only of the fused together plurality of strands.

* * * * *